Oct. 20, 1970   O. J. WASHBURN, JR., ET AL   3,534,880
PORTABLE LIFTING, HOLDING AND LOWERING DEVICE
Filed Sept. 17, 1968
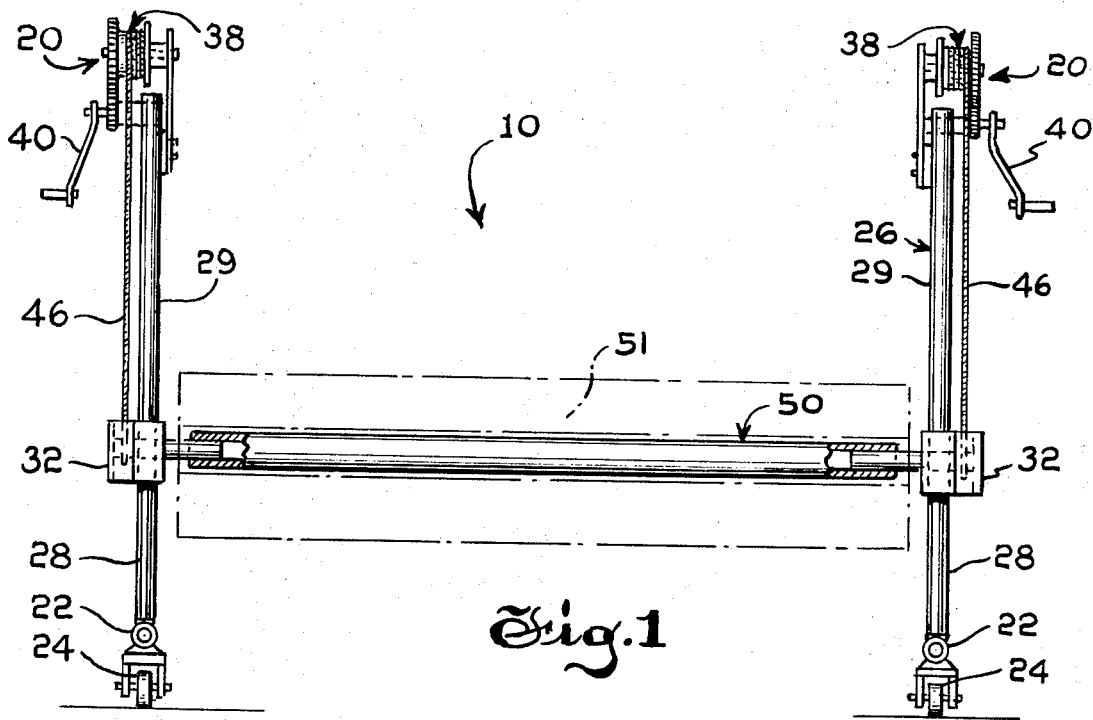
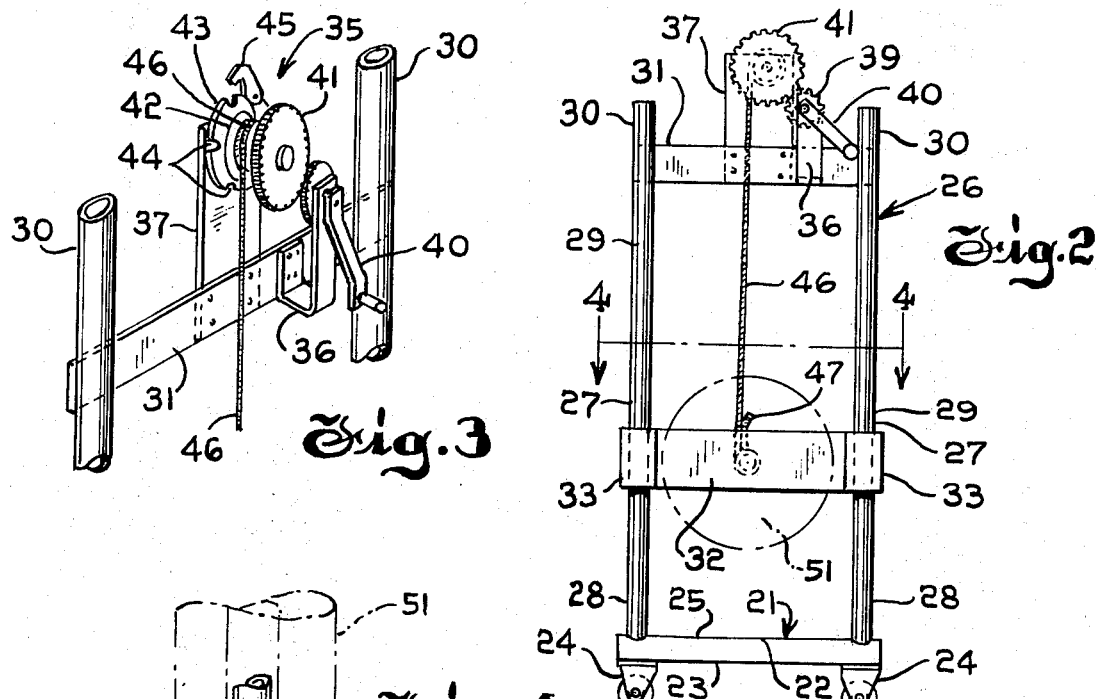
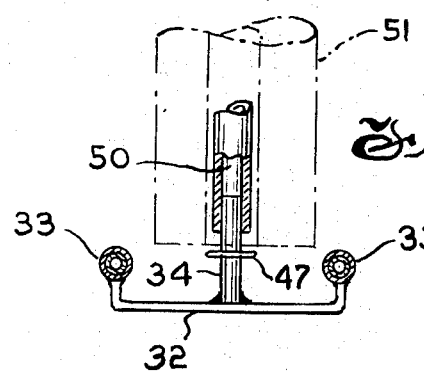
INVENTORS
JOEL R. GUNN
OMAR J. WASHBURN, JR.

United States Patent Office 3,534,880
Patented Oct. 20, 1970

3,534,880
PORTABLE LIFTING, HOLDING AND
LOWERING DEVICE
Omar J. Washburn, Jr., Rte. 2, Mena, Ark. 71953, and
Joel R. Gunn, Mena, Ark.; said Omar J. Washburn,
Jr., administrator of the estate of said Joel R. Gunn,
deceased
Filed Sept. 17, 1968, Ser. No. 761,397
Int. Cl. B60p 1/64
U.S. Cl. 214—390                                    1 Claim

ABSTRACT OF THE DISCLOSURE

Apparatus for handling such as lifting, holding, lowering and transporting material which includes at least one unit, each unit including a pair of upright members connected by a cross-member, each upright member being provided with at least one roller member and a winding member, whereby the material may be lifted, held in position, transported and lowered.

---

This invention relates to a device for handling such as lifting, moving and lowering material. More particularly, the invention relates to such a device which is portable. Still more particularly, the invention relates to a device for lifting, moving and lowering rolled material. Yet more in particular, the invention relates to such a device for use with rolls of sheet material, especially carpet rolls.

Similar devices of the prior art have tended to be more bulky, heavy and complicated than necessary as well as being more costly to manufacture than need be. Such prior devices have sometimes been made with detachable parts with the result that such parts are easily misplaced or lost.

It is therefore an object of the present invention to provide a device which is compact and nonbulky, compared to the prior art.

Another object is to provide a device which is lighter and hence easier to move about than prior devices.

Still another object is to provide a device which is relatively simple, compared to prior devices, and hence easier to operate, even by a single operator.

A further object is to provide a device which is more economical to manufacture than prior devices.

Still a further object is to provide a device having no detachable parts which could become misplaced or lost.

Other objects and advantages of the present invention will become apparent from a consideration of the following part of the specification taken in conjunction with the appended drawing in which like reference numerals refer to like parts throughout the several views, and in which:

FIG. 1 is a front elevational view of the present device in operating position supporting a roll of material shown in broken lines; and FIG. 2 is a side elevational view of the device shown in FIG. 1; and FIG. 3 is a perspective view of a part of the device shown in FIG. 2; and FIG. 4 is a partial sectional view taken along line 4—4 of FIG. 2.

The present handling device is made up of at least one unit, each unit having at least a pair of upright members, a first and a second, which are connected by a single cross-member, preferably tubular. Any number of units may be joined together endwise to form elongated multiple unit devices. Such multiple unit devices may be simply joined together with each unit having a pair of upright members, or joined together so as to share upright members. In the case of shared upright members, there is always one less cross-member required than upright members; thus for example, if two units are so joined, then three upright members are required, a first, second and third, and two cross-mmebers, a first and a second, the first cross-member connecting the first and second upright members, and the second cross-member connecting the second and third upright members.

Generally preferred, however, is a single unit device having a pair of upright members and a single cross-member between them. Such upright members preferably are identical in construction, but may be mirror images of each other if desired.

Each upright member generally includes a base portion, an upright portion, and means to raise and lower the cross-member, preferably a winding member, mounted upon the upright portion. The base portion of each upright member is preferably a generally horizontal tubular member having an underside which is preferably adapted for the attachment of at least one roller member, preferably two, more preferably casters, and at least one roller member attached thereto; the horizontal tubular member also has an upper side.

The upright portion of each upright member includes at least one upright piece, preferably a pair, and more preferably positioned at opposite ends of the generally horizontal tubular member. The at least one upright piece is preferably tubular and elongated, having a lower end which is attached generally perpendicularly to the upper side of the generally horizontal tubular member, preferably by welding; the at least one upright piece also has an intermediate portion which is preferably adapted for the attachment of a guide member; the at least one upright piece further has an upper end which is adapted for the attachment of the preferred winding member. Preferably, a pair of upright pieces are used instead of one, the lower ends of each being attached perpendicularly to the upper side of the generally horizontal tubular member, the intermediate portions of each being adapted for the attachment of a guide member, and the upper ends of each being adapted for the attachment of the winding member.

The upright portion of each upright member preferably includes a winding member mount support attached to the upper end of the at least one upright piece and forming a place of attachment for the winding member mounts; preferably a pair of upright pieces are included and the winding member mount forms a connection between them.

The upright portion of each upright member preferably includes a guide member connected to the at least one upright piece, preferably sleeved over it, and being adapted for the attachment of the cross-member thereto. More preferably, a pair of upright pieces are included and the guide member connected to both, preferably by sleeving over them both; thus connected, the guide member is capable of vertical movement only.

The preferred winding member is mounted upon the upright portion of each upright member, preferably to a support attached to the at least one upright piece thereof. The winding member includes a winch and suitable mounts for attaching it. The winch includes a relatively small gear having means to rotate it, preferably a handle, connected interengagingly to a relatively large gear which is attached to a drum having a locking device and a cable wrapped therearound, the cable having a lower end. The lower end of the cable may be connected directly to the cross-member, but is preferably connected to a suitable part of the guide member, more preferably to a projection thereon, the projection preferably being further adapted to be connected to the cross-member.

Turning now to the drawing, the unit of the present device is generally designated 10 and includes a pair of upright members 20 and a cross-member 50 connecting the two, all generally designated.

Each upright member of the pair 20 includes a base portion generally designated 21 which includes a generally horizontal tubular member 22 having an underside 23 to which rollers 24 are attached at opposite ends thereof. Member 22 further has an upper side 25.

An upright portion generally designated 26 is also a part of each member 20 and is attached to upper side 25 of member 22. Upright portion 26 includes a pair of upright pieces 27 attached at opposite ends of member 22, each having a lower end 28 disposed generally perpendicularly to member 22. Each upright piece 27 further has an intermediate portion 29 and an upper end 30. Upright portion 26 further includes a winding member mount support 31 connecting upper ends 30 of the pair of pieces 27. Upright portion 26 still further includes guide a member 32 having a pair of ends 33 which are sleeved over upright pieces 27. Guide member 32 further has a projection 34 which is adapted to be attached to cross-member 50.

Each upright member 20 further includes a winding member generally designated 35 which includes a first mount 36, a second mount 37, and a winch generally designated 38. Winch 38 includes a relatively small gear 39 attached to first mount 36 and having a handle 40 for rotating it; a relatively large gear 41 in engagement with relatively small gear 39 and attached to second mount 37; a drum 42 connected to relatively large gear 41 and having an end portion 43 having a plurality of notches 44 which are adapted to be engaged by a pawl; a pawl 45 adapted to engage a selected one of the notches 44 when desired; and a cable 46 wound about the drum 42 and having a lower end 47 which is attached to projection 34.

Cross-member 50 is tubular and its opposite ends are sleeved over projections 34, thus joining upright members 20 and forming a unit. A roll of material 51 is positioned about cross-member 50 in operative position.

In operation, to pick up material, especially rolled material, initially, cross-member 50 is first attached to the material; in the case of rolled material, member 50 is thrust through the center of the roll. Then the first of the pair of upright members is brought up and the height of guide member 32 adjusted by means of winch 38 so that projection 34 is in alignment with cross-member 50. Then the projection 34 is inserted into the tubular member 50. Then the process is repeated with the other upright member of the pair, fully connecting the upright members 20 and cross-member 50, except for cables 46. Cables 46 are connected to cross-member 50, or more preferably, to guide member 32. Thus each end of cross-member 50 may be successively raised by means of each winch 38 until raised to any desired height. Then the unit may be rolled to any desired spot and the material lowered any amount desired by reversing the sequence of steps described above.

It will be understood by those skilled in the art that the present device has all the advantages over the prior art that has been previously set forth.

It is to be understood that only the preferred embodiments of the invention have been shown and described herein and that the invention may be practiced otherwise than as specifically shown and described and within the scope of the appended claim.

What is claimed is:

1. Transportable lifting, lowering and handling equipment for rolled material containing a hollow core and including a pair of separate, wheeled lifting units, each of said units comprising:

a pair of upright supports rigidly interconnected adjacent their upper and lower ends by upper and lower cross braces, wheel means on said lower cross brace, manually operated lifting means including a gear reducer drivingly interconnecting a hand crank and cable winch mounted on said upper cross brace, a rigid guide slidably mounted on said pair of upright supports for vertical movement between said upper and lower cross braces, outwardly extending projection means rigidly carried by said guide, cable means interconnecting said winch and guide;

and a tubular cross member adapted to be received within a hollow roll core and supported at opposite ends thereof on said projection means and between said units for raising, lowering and transporting of rolled material.

References Cited

UNITED STATES PATENTS

| | | | |
|---|---|---|---|
| 1,067,625 | 7/1913 | Smith. | |
| 2,463,381 | 3/1949 | Hicks. | |
| 2,551,097 | 5/1951 | Cole | 214—390 |
| 2,816,675 | 12/1957 | Baker | 214—390 |
| 3,404,794 | 10/1968 | Wilson | 214—390 XR |

ALBERT J. MAKAY, Primary Examiner

U.S. Cl. X.R.

254—4